W. A. KIRBY.
Harvesting Machine.
No. 1,838.
Reissued Dec. 20, 1864.
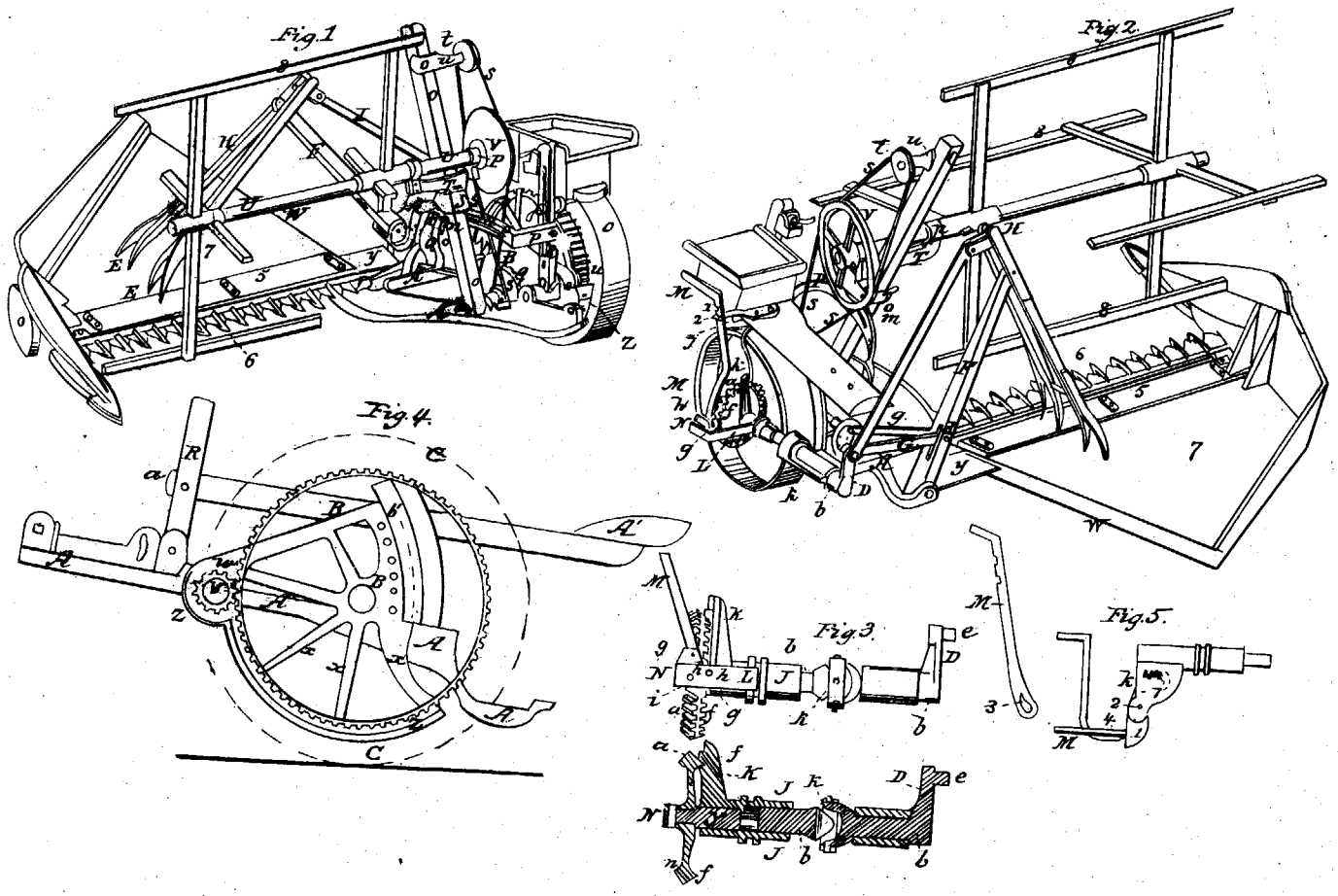
Witnesses
Jno. P. Patton
A. Moore
William A. Kirby & David M. Osborn
by their atty A. B. Stoughton
N. PETERS, Photo-Lithographer, Washington, D. C.

UNITED STATES PATENT OFFICE.

WM. A. KIRBY AND DAVID M. OSBORNE, OF AUBURN, NEW YORK, ASSIGNEES OF WM. A. KIRBY.

IMPROVEMENT IN HARVESTING-MACHINES.

Specification forming part of Letters Patent No. 32,736, dated July 2, 1861; Reissue No. 1,493, dated June 9, 1863; Reissue No. 1,838, dated December 20, 1864.

*To all whom it may concern:*

Be it known that WILLIAM A. KIRBY, of Buffalo, in the county of Erie and State of New York, did invent certain new and useful Improvements in Harvesting-Machines and the Raking Apparatus thereof; and we do hereby declare that the following is a full, clear, and exact description thereof, reference being had to the accompanying drawings, making a part of this specification, in which—

Figure 1 represents a perspective view of a harvesting-machine, taken from the front and looking obliquely toward the main frame and the driving-gear. Fig. 2 represents a perspective of the machine, taken from the rear of the main frame and looking toward the outside divider. Fig. 3 represents a view of the rake-gearing detached and on an enlarged scale to better show its action. Fig. 4 represents a side view of the main frame and main drive-wheel to show the manner of arranging the shield on the frame to protect the gearing that runs close to the ground. Fig. 5 represents a modification of the device for throwing the rake in and out of gear with the driving-gear of the machine.

The drawings represent a harvesting-machine in detail, many of the details of which have been heretofore patented to the said WILLIAM A. KIRBY, or to him and his associates. It is not therefore deemed necessary to a full understanding of that part of the invention claimed in this application to describe the machine fully, especially as the whole machine is clearly shown in the drawings.

In harvesting-machines where the cutting apparatus and platform are set up or down to cut at various heights, or where the cutting apparatus and platform rise and fall in accommodating themselves to the inequalities of the ground, and the relative positions of the wheel and platform are changed, and where a rake is used for delivering the cut grain from the platform, said rake being worked automatically, it is necessary that the rake should rise and fall with the platform, so as to preserve a uniform relative working position therewith. When the automatic rake is driven from the main supporting or carrying wheel, which wheel always maintains a uniform height above the ground, it is necessary to make provision for the adjustment of the rake so that it or its gear shall not cramp or bind when the rake and platform is raised or lowered, or the positions of the wheel and platform are changed relatively to each other. Provision should also be made for the varying length of shaft required in consequence of the varying distance between the platform and driving-wheel and gearing caused by the rising and falling of the platform, while the driving-wheel and said gearing remain at all times at the same height.

To accomplish these ends is the object and purpose of this part of the invention; and it consists in making a universal joint between the driving-gearing and the rake, and also the employment of an adjustable shaft, so that as the platform is raised or lowered the rake may conform to it and continue adjusted to the platform, and without causing its gear to bind or cramp.

To enable others skilled in the art to make and use this part of the invention, we will describe the same with reference to the drawings.

A represents a main frame, to which the finger-bar 5, cutting apparatus 6, platform 7, reel 8, and a portion of the driving-gear 9 are connected; and B is a supplementary or segmental frame pivoted to the main frame, this frame B having the main driving and supporting wheel C, as well as the driver's seat and some of the gearing, connected with it. There is attached to the main wheel a bevel-pinion that turns with the driving-wheel. This pinion gears into and turns a bevel-gear, *a*, which is attached to a shaft, *y'*, which enters the sleeve J, and in the opposite end of which sleeve J another shaft, *b*, enters, (the two forming an adjustable shaft,) having upon it a feather which fits into a corresponding recess made to receive the same in said sleeve J. Said shaft *b* also has a universal joint, *k*, and is provided at its other end with a crank, D, for operating the rake E, as follows: A rake-post, F, is hinged at *c* to a projecting portion of the main frame A, the hinge-joint being so arranged as that the said rake-post may swing toward and from the grain side of the platform. A connecting rod or bar, G, is pivoted to the rake-post F at the point *d*, and its other end is pivoted to the wrist-pin *e* of the crank D, so that this crank and connecting-rod define the swinging motion of said rake-post—that is to say, its extent of motion. To the top of the rake-post is pivoted the shank or handle H of the rake or fork E, this shank extending beyond its pivoted point and at or near its end, having a pitman, I, connected with it, which pitman also extends to and is connected with the wrist-pin *e* of the crank D, so that the crank D gives a compound motion to the rake by swinging the rake-post toward and from the outside divider or fence by means of the pitman G, and causing it to rise and fall, and thus be drawn back over the platform mainly by the pitman I, but partially by the pitman G. The platform and cutting apparatus must be raised and lowered to cut at a suitable height, and the rake must consequently be raised and lowered with it. Now, the rake, as above described, is arranged in connection with the platform, while it is driven from the main wheel C, and inasmuch as the height of the rake and platform will vary relatively to said main wheel C, according to the height of the cut from the ground, without some suitable provision to meet this relative change of height the rake and its gear would so bind and cramp as to stop, cut, or break. To provide for this contingency the universal joint *k* and the adjustable shaft J, *b*, and *y''* are provided, which allow those parts all their requisite play or adjustment, and leave the rake free to accommodate itself to the platform at any of its positions without cramping or binding its gear.

Having thus fully described the nature and object of this part of the said KIRBY'S invention, what is claimed under this Patent is—

1. In combination with an automatic rake, an adjustable shaft, for the purpose and in the manner substantially as described.

2. In combination with the adjustable shaft of an automatic rake, the universal joint *k*, for the purpose and in the manner substantially as described.

3. In a harvesting-machine having an adjustable connection between that part which carries the automatic rake and that part which carries the gearing, the adjustable shaft and universal joint, substantially as and for the purpose described.

WM. A. KIRBY.
D. M. OSBORNE.

Witnesses:
DAVID WRIGHT,
CHAS. R. KING.